United States Patent
Hinson

(10) Patent No.: US 7,103,260 B1
(45) Date of Patent: Sep. 5, 2006

(54) VIDEO EDITING SYSTEM

(75) Inventor: Neil Roy Hinson, Newbury (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 09/537,986

(22) Filed: Mar. 29, 2000

(30) Foreign Application Priority Data

Apr. 16, 1999 (GB) .................. 9908832.0

(51) Int. Cl.
*H04N 5/91* (2006.01)
(52) U.S. Cl. .......................... 386/52; 386/131
(58) Field of Classification Search .......... 386/46, 386/52, 112, 125, 54, 131; 348/441, 458
See application file for complete search history.

(56) References Cited

U.S. PATENT DOCUMENTS

| | | | | |
|---|---|---|---|---|
| 4,963,995 A | * | 10/1990 | Lang | 386/54 |
| 5,221,966 A | * | 6/1993 | Clayton et al. | 348/443 |
| 5,418,572 A | * | 5/1995 | Nonweiler et al. | 348/446 |
| 5,808,628 A | * | 9/1998 | Hinson et al. | 345/547 |
| 5,999,220 A | * | 12/1999 | Washino | 348/441 |

FOREIGN PATENT DOCUMENTS

| | | |
|---|---|---|
| GB | 2220539 | 1/1990 |
| GB | 2251755 | 7/1992 |
| GB | 2255254 | 10/1992 |
| GB | 2257591 | 1/1993 |
| GB | 2260055 | 3/1993 |
| GB | 2305801 | 4/1997 |
| WO | WO9119379 | 12/1991 |
| WO | WO9509412 | 4/1995 |

* cited by examiner

*Primary Examiner*—Huy Nguyen
(74) *Attorney, Agent, or Firm*—Cooper & Dunham LLP

(57) ABSTRACT

There is described an editing system in which image data representing an initial moving image input in a first format at a corresponding rate is stored in a store and is manipulated to produce image data representing an edited moving image for output in a second format at a corresponding data rate. The system is arranged such that processing is effected at a data rate which is variable and determines the second data rate.

38 Claims, 2 Drawing Sheets

VIDEO EDITING SYSTEM

BACKGROUND

There are several different broadcast standards for television widely in use around the world. Of these, one is the so-called NTSC standard used in the United. States in which television pictures are broadcast at a rate of 30 frames per second, two interleaved fields per frame and 525 lines per frame, and another is the so-called PAL standard used in Europe in which pictures are broadcast at 25 frames per second, two interleaved fields per frame and 625 lines per frame. Movies are captured on film at a rate of 24 frames per second. Top selling television programmes for example "episodics" such as the American television series "ER" are also shot on film at the 24 frames per second rate. Once scenes have been shot the film frames are transferred into an electronic domain by way of a telecine machine.

Plainly, there is an incompatibility between the 24 frames per second of film and the 25 PAL frames and 30 NTSC frames of television. This incompatibility is overcome in one of two ways. If the film is to be shown on NTSC television the film is run through the telecine at 24 frames per second and the film frames are scanned as two television fields. The 24 frames are converted to 30 frames by outputting the first field of the first frame, then the second field and then the first field again. Next, the second field of the second frame is output, then the first. For the third frame the second field is output, then the first and then the second, and for the fourth frame the first field is output first followed by the second. This pattern is repeated for the next group of four frames. The result of this is that 24 film frames (corresponding to one second of moving image) lasts for 60 television fields (also corresponding to one second of moving image). This technique is known as 3:2 pull down and is described for example in our British Patent Application No. 9209204.8 and corresponding U.S. Pat. No. 5,418,572, the teachings of which are incorporated herein by reference.

In both the NTSC and PAL broadcast standards each television frame comprises two interleaved fields. One field comprises all the odd numbered lines in a frame and the other field comprises all the even numbered lines in a frame. If the film is to be viewed on a PAL system at 25 frames per second each film frame is scanned twice (once for each television field) by the telecine. Frames are output from the telecine at a rate of 25 per second. As a result, when the television signals are displayed, one second of film (24 frames) only lasts for 0.96 seconds of television. The speed of action and dynamics in the picture are increased and sound is heard at a slightly higher pitch. Movies and programmes originating on film have always been viewed in this way on PAL televisions.

While these two approaches provide an adequate solution to frame rate incompatibility, they are nevertheless separate operations and it is not possible satisfactorily to convert films or programmes between NTSC and PAL if they have already been converted from the 24 frame movie format to the 25 or 30 frame format of PAL or NTSC. Simply converting from one television standard to the other introduces unacceptable artifacts as the frame rate is changed between 25 and 30 per second and the line rate is changed between 525 and 625 per frame. One way of overcoming this problem is to carry out the editing twice, once to convert from film to NTSC and once to convert from film to PAL. Plainly this is undesirable because it is difficult (dynamics are different at a frame level between the two standards), the effects applied in one standard have to be applied again in the other standard, and costs are increased significantly.

There has recently been a move towards making a single 625 line master tape. The approach that has been adopted is to use a conventional tape-based edit suite with a standard 25/625 VTR adapted so that it is able to record and play the same tape at either the standard 25 frames per second or at a slower 24 frames per second and 625 lines per frame. During the editing process the moving picture is viewed at the correct pace of 24 frames per second and thus the dynamics in the picture are also seen correctly. Once a satisfactory edit has been created and stored on tape, the tape is simply played back at 25 frames per second (4 percent faster than real image time) to give the correct 25/625 rate for PAL.

When an NTSC master tape is required the edited clip is output at 24 frames per second to circuitry which converts the 625 lines to 525 lines and converts the 24 frames per second into 30 frames per second using 3:2 pull down techniques. The resulting video is recorded on to standard 30/525 tape for subsequent playback on standard NTSC equipment. Using this approach also requires the audio to be resampled. The audio signal is normally sampled at a rate of 48 KHz, but when the tape speed is reduced from 25 to 24 frames per second there is a corresponding reduction of the audio sampling rate to 46 KHz. The audio signal is therefore reclocked (without pitch change) from the incorrect 46 KHz sampling rate to the correct 48 KHz sampling rate.

Off-line non-linear editing systems are available which are capable of manipulating 30 frames per second video generated by way of 3:2 pull down. One such system is arranged to remove the additional fields generated by the 3:2 pull down operation and to store only the two fields that make up each frame. The output of such a system is put through an internal 3:2 conversion so that the user of the system views the output at 60 fields per second. The system produces a standard 30 frames per second edit decision list (EDL).

Another approach to overcoming the aforementioned problems is to carry out an edit using such an off-line non-linear editing system in order to make an EDL which is then conformed at either 24 frames per second or 25 frames per second. Either frame rate is acceptable, the important thing is that the edit occurs in the right place. A modified VTR is used to play back video rushes at 24 frames per second to enable 30 frame per second dubs to be produced (via 3:2 pull down). The 30 frame per second dubs are taken into an off-line non-linear editing system, as aforementioned. Editing decisions are made using the system and a standard 30 frames per second EDL is produced. The EDL thus produced is fettled to produce a 25 frames per second EDL which is then used to conform the high-quality 625 rushes in a tape based auto-conform suite to produce the 625 master tape, which is only correctly paced when played at 24 frames per second.

The aforementioned modified VTR may also be used to play back a 25/625 master at 24 frames per second in order to enable the production (via 3:2 pull down) of 30/525 distribution copies from the 25/625 master.

Again, while this approach is able to produce satisfactory results, it is nevertheless laborious, difficult and thus expensive to produce separate 25/625 and 30/525 distribution copies from a single master.

SUMMARY

The present invention aims to overcome or at least reduce the above and related problems.

According to the invention there is provided an editing system for moving images, the editing system comprising: a frame-random access store for storing image data representing a sequence of image frames which together form a moving image, the store storing data such that the frames can be accessed in a random order; an input circuit for receiving from a source data representing one or more sequences of image frames captured at a first frame rate, the data being received at an input data rate and representing each frame in a sequence as a first multiplicity of image lines which together form the image frame, and for transferring the data to the frame-random access store; an editing processor for editing data read from the store at a processed data rate to produce data representing an edited sequence of image frames; and an output circuit for outputting edited data representing an edited sequence of image frames at a second frame rate, the data being output at an output data rate and representing each frame in the edited sequence as a second multiplicity of image lines which together form the image frame.

The invention also provides an editing system in which image data representing an initial moving image input in a first format at a corresponding rate is stored in a store and is manipulated to produce image data representing an edited moving image for output in a second format at a corresponding data rate, the system being arranged such that processing is effected at a data rate which is variable and determines the second data rate.

DESCRIPTION OF THE DRAWINGS

The above and further features of the invention are set forth with particularity in the appended claims and together with advantages thereof will become clearer from consideration of the following detailed description of an exemplary embodiments of the invention given with reference to the accompanying drawings.

In the drawings.

DETAILED DESCRIPTION

Figure 1:
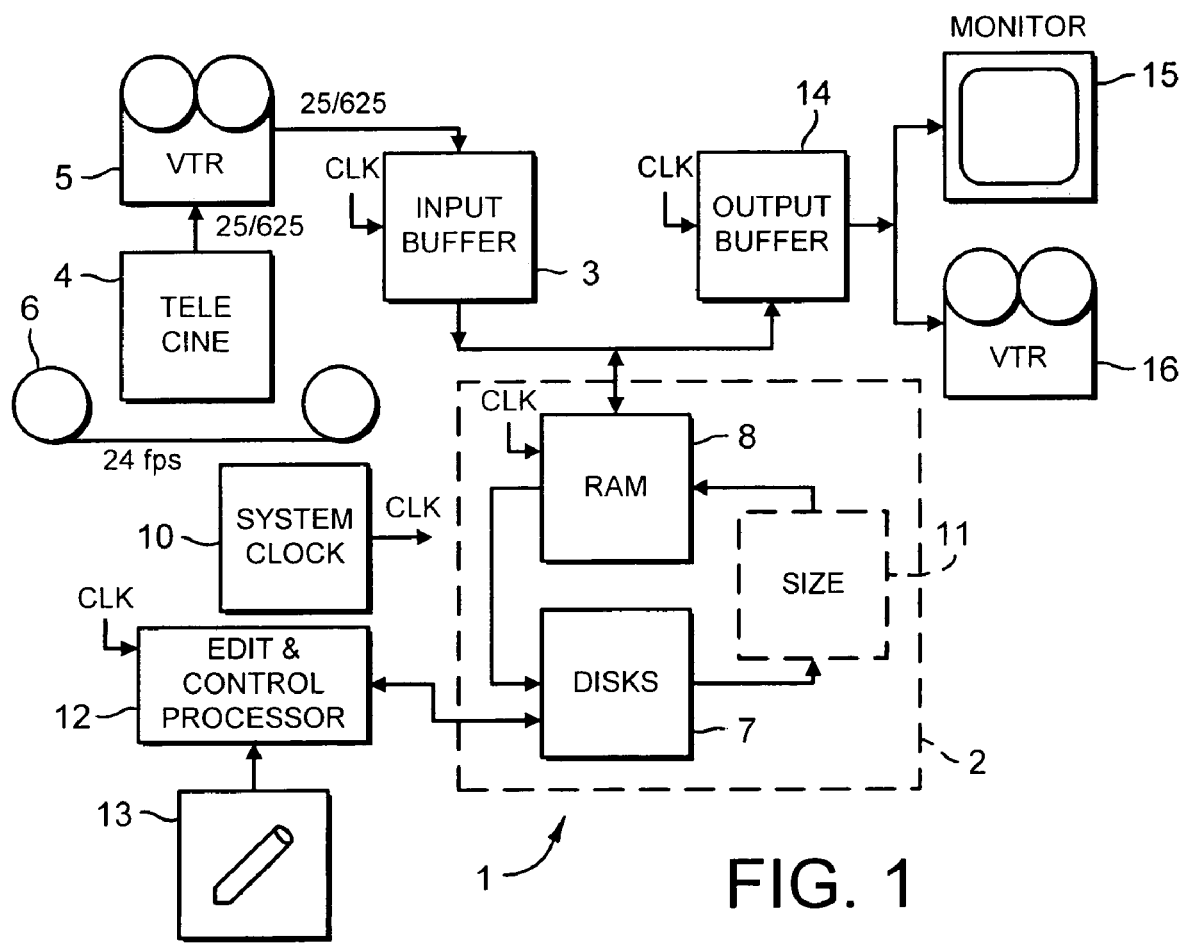
FIG. 1 is a schematic functional block diagram of a system embodying the invention.

Turning now to FIG. 1 of the accompanying drawings there is shown a video editing system 1 comprising a frame-random access data store (represented by the broken lines 2) connected to receive video data via an input butter 3 (suitably a FIFO buffer) from one or more video sources, for example a telecine 4 or a video tape recorder (VTR) 5. Both the telecine 4 and the VTR 5 are standard video data sources designed to supply data representing video frames at a predetermined frame rate, with each frame comprising a predetermined number of lines per frame.

Movie cameras are designed to capture movie images on film at a rate of 24 frames per second. The telecine 4 is designed to scan each frame of the film clip into a predetermined number of lines and to output that data in the format of 25 frames per second, 2 interleaved fields per frame and 625 lines per frame. Thus the telecine 4 generates video data representing image frames from a film clip 6. The VTR 5 is also designed to output video data in the format of 25 frames per second with two interleaved fields together comprising a total of 625 lines per frame. This will be referred to herein as the 25/625 format. Both the telecine 4 and the VCR 5 are standard pieces of equipment and need not be described in any greater detail herein.

FIG. 1 shows the telecine 4 connected to the VTR 5, because this is the normal route by which data would be supplied from a telecine to an editing system. There is however no technical reason why the telecine 4 should not be connected directly to the input buffer 3 to input data to the frame-random access data store 2.

The frame-random access data store 2 is a large data storage device capable of storing data representing video frames in frame-random access order. That is to say, the data representing any frame stored in the store can be accessed as quickly as the data representing any other frame in the store. Typically the store comprises a number of disk stores 7 connected to RAM or other buffers 8 and to data interfaces and highways which together enable video data to be output therefrom at a rate (for example the 25/625 rate) determined by a system clock 10. The system clock 10 is arranged to generate a clocking signal representing the frame rate (e.g. 25 per second) of the video data. Transfers of data around the system 1 are synchronised to the clocking signal so that, for example, 25 frames of data are input to or output from the store 2 in each second. The store 2 may also comprise a sizing circuit 11 for changing the size of frames of data, for example, from 625 lines to 525 lines per frame. The sizing circuit 11 comprises an interpolator and is connected to change the size of data output from the disk stores 7 before the data is input to the RAM buffers 8. The store 2 may be based on the data storage apparatus described in our British Patent Application No. 9226199.9 published as GB-A-2273584 and corresponding U.S. Pat. No. 5,765,186, the teachings of which are incorporated herein by reference.

The system 1 also comprises an edit and control processor 12 connected to the frame random access store 2 to enable editing and processing of the data stored therein. Operation of the edit and control processor 12 is controlled by a user by way of a stylus and touch tablet 13 or other user operable input device which generates control signals in response to manipulation thereof. The edit and control processor 12 is in itself known and is described, for example, in British Patent Application No. 9205503.7 published as GB-A-2266037 and corresponding U.S. Pat. No. 5,808,628, the teachings of which are incorporated herein by reference. Together the store 2 and the processor 12 enable video data to be combined to produce data representing an edited and/or processed clip from the initial data input to the store 2 from the telecine 4, the VTR 5, or other video data sources (not shown).

The store 2 has associated with it an output buffer 14 which is arranged to receive video data from the store 2 at the rate determined by the system clock 10. The buffer 4 is connected to a monitor 15 to enable (among other things) an edited video clip to be previewed, and to a video tape recorder (VTR) 16 or other bulk storage device to enable an edited video clip to be stored off-line once the user is satisfied with the result of the editing performed using the system 1.

The system 1 is operable in a number of different modes including an input mode when the system clock 10 is set at one rate and a preview mode when the system clock is set at another rate. When operating in the input mode the system clock 10 is arranged to generate clocking signals appropriate to the 25/625 rate at which data is input from the VTR 5. As data is input from the VTR to the store 2, the data may also be output via the output buffer 14 for display of the image represented thereby on the monitor 15. The dynamics of the image are not correct when displayed in this mode because 25 frames are displayed in a period when only 24 frames should be displayed.

In the preview mode the system clock 10 is arranged to generate clocking signals appropriate to the display of data on the monitor 15 at a rate of 24 frames per second and 625 lines per frame (24/625). This corresponds to the frame rate at which the original images were captured on film and thus the dynamics of the scene are accurately represented. The monitor 15 shown in FIG. 1 is a standard 25 frames per second monitor. Despite being designed for a frame rate of 25 frames per second, most, if not all, monitors currently available on the market can be adjusted (by varying the vertical sync signal) to display frames at a rate of 24 per second. Such an adjustment may be made manually by the operator or automatically by the system 1 depending on the particular monitor used.

Editing operations are effected at the 24 frames per second rate by the edit and control processor 12 in response to editor (user) manipulation of the stylus and touch tablet 13 with data movements within the system all occurring at a rate corresponding to the 24/625 rate. During the editing the editor is able to review the dynamics in the moving image at the correct speed. Audio is also adjusted to get proper synchronisation between movement and sound. Once the editor is satisfied data representing the edited video is output from the store 2 via the output buffer 14 to a storage device such as the VTR 16.

The data may be output at the 25/625 rate for storage directly on the VTR 16 or other bulk storage device in a form suitable to, for example, the European PAL format. In this case the system clock would be set to generate clocking signals appropriate to the 25/625 rate of the PAL standard.

Alternatively, if the video data is to be stored in a form suitable to the NTSC standard of the US, the system clock would be set to generate clocking signals appropriate to the 24/625 rate. The store 2 would be arranged so that data is transferred from the disks 7 to RAM 8 via the size circuit 11. The size circuit 11 would be arranged to convert the 625 lines to 525 lines. Data at a rate of 24/525 would be output from the output buffer 14 to the VTR 16 or other bulk store via a 3:2 pull down circuit (not shown). Thus, the data stored in the VTR would be stored at a 30/525 rate which corresponds to the rate for NTSC.

Such an arrangement with a 3:2 pull down circuit could also be used during editing to allow the editor to preview the effects of an edit at 60 fields per second. The 25/625 monitor 15 would be replaced with a 30/525 monitor, thereby enabling the editor to see the edit as a 30/525 output. Indeed, it is also possible to convert to from an aspect ratio of 4:3 for standard PAL and NTSC to a wide screen aspect ratio of 16:9 by configuring the sizing circuit 11 to effect such a conversion. Such a conversion could equally be applied to a 25 frames per second output or a 30 frames per second output.

The invention is not limited to the 24 frames per second of movies, the frames per second of PAL and the 30 frames per second of NTSC, or to the 625 lines of PAL and 525 lines of NTSC. Other standards can be achieved using the system 1 shown in FIG. 1 by the appropriate modification of clocks and data rates.

Figure 2:
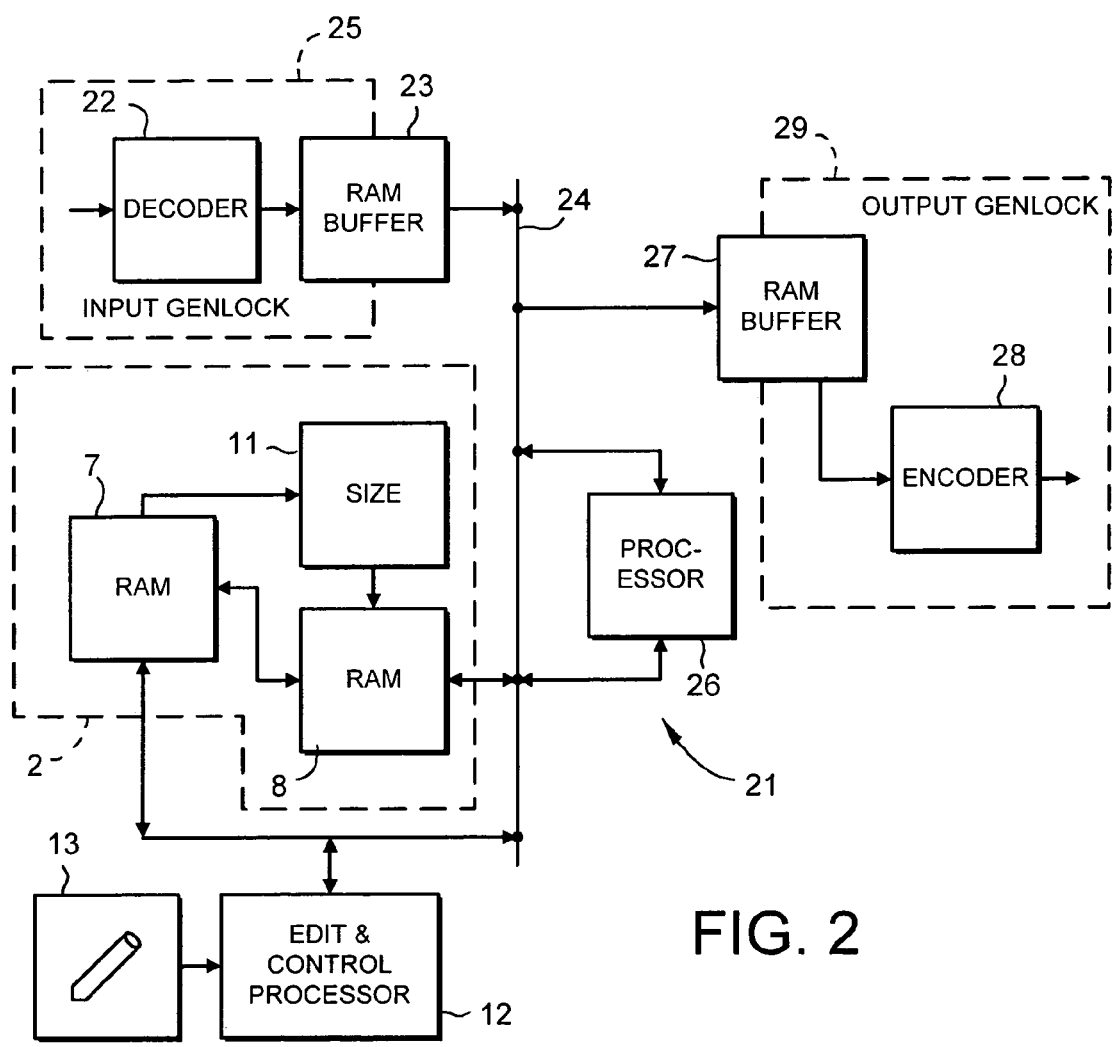
FIG. 2 is a schematic functional block diagram of another system embodying the invention.

The system 1 shown in FIG. 1, whilst able to receive, manipulate and output data at different rates, is nevertheless restricted in that at any given time only one clock is running. Thus data cannot simultaneously be input at one data rate and output at another different data rate. FIG. 2 of the accompanying drawings represents a system which addresses this and related issues.

Referring now to FIG. 2, there is shown a system 21 having in common with the system 1 shown in FIG. 1 many of the same elements. For the sake of conciseness elements which are equivalent to those of FIG. 1 have been given the same reference numeral. The elements of FIG. 2 will only be described insofar as they differ from the equivalent elements of FIG. 1.

Video signals are input to the system via an input decoder 22. The signals may be supplied from any suitable source (not shown) including a VTR, a video camera, a frame random access store, etc. It follows that the video signals may represent video images in any one of the wide range of video standards that have now been defined. Thus, in addition to the aforementioned 25/625 PAL and 30/525 NTSC standards, the signals may represent video at a high definition (HD) standard, including the draft SMPTE standard of 1080 lines per frame and 24 frames per second (24/1080) and ITU-R 60/1125 and 50/1250 production standards. The decoder 22 is arranged to remove sync signals and the like from the incoming signals and to convert the signals into data representing lines of pixels. The size of frames and the frame rate are not varied by the decoder 22. Operation of the decoder 22 is "genlocked" i.e. synchronised, to the rate of the incoming signals from the source. A RAM buffer 23 is connected between the decoder 22 and an asynchronous system bus 24. Since the bus 24 is asynchronous it is necessary to ensure that the RAM buffer 23 is large enough that none of the incoming data is lost before being transferred on to the system bus. Thus, the RAM buffer 23 provides an interface between the genlocked input operations within box 25 and the asynchronous transfers of data over the system bus 24.

Data from the RAM buffer 23 is transferred via the system bus 24 to a frame random access store 2 which is equivalent to the store shown in and described with reference to FIG. 1 of the accompanying drawings. The system 21 may also comprise a processor 26 for pre-processing the data before it is transferred to the store 2 or to process the data as it is read from the store 2, the processor 26 is shown as a separate unit but may in fact form part of the edit and control processor 12 and thus be responsive to editor (user) manipulation of the stylus and touch tablet device.

An output RAM buffer 27 is also connected to receive data from the system bus 24. The output RAM buffer 27 is connected to an encoder 28 which is genlocked to output data at an output data rate. The encoder 28 may be connected to output signals to any suitable device (not shown) including a VTR, a monitor or a frame-random access store. It follows that the output data rate may be the same as the input data rate, or the frame and/or line rate may be different (larger or smaller) than the input rate. The aspect ratios of the images represented by the input and output data may be the same or may differ from each other. The output RAM buffer 27 and the encoder 28 work together so that operations within the box 29 are genlocked to the output device. Signals from the encoder 28 may be output to a monitor and/or bulk store (not shown) for display and/or storage thereat at the output data rate.

The system 21 shown in FIG. 2 thus enables input material to be stored "native" in the store 2, i.e. at its original frame and line rates, to be freely edited with other material stored native in its own format, which may be different, and the result to be output at any desired standard by resizing each frame to the desired standard as it is output. This flexibility is made possible in part by the separation of the genlocked input and output operations 25, 29, and in part by the provision of the sizing circuit 11 and processor 26 which are able to process data "on the fly" as it is transferred from, over and to the asynchronous system bus.

Thus, for example, it is possible to combine video from a 24/1080 clip with a 25/625 clip to produce a combined clip which is output at, say, the 24/1080 clip by up-converting the 25/625 frames to 24/1080 frames as the data is output onto the system bus 24. By way of another example, if it is desired to convert a clip from 24 frames per second to 30 frames per second, the processor 12 would be arranged to control the store 2 such that each frame of data is read out as two interleaved fields with the outputting one field of each frame being repeated to produce a 3:2 pull down, 30 frames per second version of the original 24 frames per second clip. Other combinations and conversions are, of course, also possible.

Having thus described the present invention by reference to a preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

The invention claimed is:

1. An editing system for moving images, the editing system comprising:
   a frame-random access store for storing image data representing a sequence of image frames which together form a moving image, the store storing data in an input format as captured such that the frames can be accessed in a random order;
   an input circuit for receiving from a source data representing sequences of image frames in a plurality of input formats, wherein each of said sequences of image frames are captured at a first frame rate, the data representing each frame in a sequence as a first multiplicity of image lines which together form the image frame, and wherein each of said input format is defined by said first frame rate and said first multiplicity of image lines, and for transferring the image data in said input formats to the frame-random access store;
   wherein said store is adapted to store said image data in said plurality of input formats;
   an editing processor for editing data read from the store at a processed data rate to produce data representing an edited sequence of image frames; and
   an output circuit for outputting edited data from said store in a plurality of output formats,
   wherein each of said edited data represent an edited sequence of image frames at a second frame rate, the data being output at an output data rate and representing each frame in the edited sequence as a second multiplicity of image lines which together form the image frame,
   wherein each of said output formats is defined by said second frame rate and said second multiplicity of image lines,
   and wherein the respective input and output format for data representing a sequence of image data are either the same or different.

2. An editing system for moving images, the editing system comprising:
   a frame-random access store for storing image data representing a sequence of image frames which together form a moving image, the store storing data such that the frames can be accessed in a random order;
   an input circuit for receiving from a source data representing one or more sequences of image frames captured at a first frame rate, the data being received at an input data rate and representing each frame in a sequence as a first multiplicity of image lines which together form the image frame, and for transferring the data to the frame-random access store;
   an editing processor for editing data read from the store at a processed data rate to produce data representing an edited sequence of image frames;
   an output circuit for outputting edited data representing an edited sequence of image frames at a second frame rate, the data being output at an output data rate and representing each frame in the edited sequence as a second multiplicity of image lines which together form the image frame; and
   an asynchronous bus connecting said store, said input circuit, said editing processor and said output circuit, and wherein:
   the input circuit comprises a decoder arranged to receive data synchronously from a source and a buffer for transferring data from the decoder to the asynchronous bus; and
   the output circuit comprises an encoder arranged to output data synchronously to a destination and a buffer for transferring data from the asynchronous bus to the encoder.

3. An editing system as claimed in claim 2, further comprising a sizing circuit for varying the number of lines between said first multiplicity and said second multiplicity in each frame as data is transferred to the output circuit.

4. An editing system as claimed in claim 3, further comprising a monitor connected to receive data from the output circuit at said output data rate for display of said edited sequence thereon.

5. An editing system as claimed in claim 4, further comprising a linear store connected to receive data from the output circuit at said output data rate for storage of said edited sequence therein.

6. An editing system as claimed in claim 5, wherein said linear store comprises a video tape recorder selectively operable to output stored data at either said first frame rate or said second frame rate.

7. An editing system as claimed in claim 6, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

8. An editing system as claimed in claim 7, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

9. An editing system as claimed in claim 8, wherein said processor is arranged to edit data at a processed data rate substantially corresponding to 24 frames per second and 625 lines, and the output circuit is arranged to output data at an output data rate substantially corresponding to the processed data rate.

10. An editing system as claimed in claim 8, wherein said processor is arranged to edit data at a processed data rate substantially corresponding to 24 frames per second and 625 lines, and the output circuit is arranged to output data at an output data rate substantially corresponding to 30 frames per second and 525 line.

11. An editing system as claimed in claim 10, wherein said processor is arranged to extract frame data from the frame-random access store as pairs of interleaved fields and to repeat the transfer of one field of each pair to the output circuit thereby causing the output circuit to output the edited sequence at said frame rate of 30 per second.

12. An editing system as claimed in claim 11, wherein said edited sequence comprises image frames derived from a first initial sequence comprising frames at a first frame rate and first line rate and image frames derived from a second initial sequence comprising frames at a second frame rate and second line rate different than said first frame and line rates, and wherein said processor is arranged to process the data for each frame in the edited sequence to conform to a line and frame rate corresponding to said output data rate.

13. An editing system as claimed in claim 1, further comprising a sizing circuit for varying the number of lines between said first multiplicity and said second multiplicity in each frame as data is transferred to the output circuit.

14. An editing system as claimed in claim 13, further comprising a monitor connected to receive data from the output circuit at said output data rate for display of said edited sequence thereon.

15. An editing system as claimed in claim 14, further comprising a linear store connected to receive data from the output circuit at said output data rate for storage of said edited sequence therein.

16. An editing system as claimed in claim 15, wherein said linear store comprises a video tape recorder selectively operable to output stored data at either said first frame rate or said second frame rate.

17. An editing system as claimed in claim 16, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

18. An editing system as claimed in claim 17, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

19. An editing system as claimed in claim 13, further comprising a linear store connected to receive data from the output circuit at said output data rate for storage of said edited sequence therein.

20. An editing system as claimed in claim 19, wherein said linear store comprises a video tape recorder selectively operable to output stored data at either said first frame rate or said second frame rate.

21. An editing system as claimed in claim 20, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

22. An editing system as claimed in claim 21, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

23. An editing system as claimed in claim 1, further comprising a monitor connected to receive data from the output circuit at said output data rate for display of said edited sequence thereon.

24. An editing system as claimed in claim 1, further comprising a linear store connected to receive data from the output circuit at said output data rate for storage of said edited sequence therein.

25. An editing system as claimed in claim 24, wherein said linear store comprises a video tape recorder selectively operable to output stored data at either said first frame rate or said second frame rate.

26. An editing system as claimed in claim 25, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

27. An editing system as claimed in claim 26, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

28. An editing system as claimed in claim 1, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

29. An editing system as claimed in claim 28, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

30. An editing system as claimed in claim 2, further comprising a monitor connected to receive data from the output circuit at said output data rate for display of said edited sequence thereon.

31. An editing system as claimed in claim 2, further comprising a linear store connected to receive data from the output circuit at said output data rate for storage of said edited sequence therein.

32. An editing system as claimed in claim 31, wherein said linear store comprises a video tape recorder selectively operable to output stored data at either said first frame rate or said second frame rate.

33. An editing system as claimed in claim 32, further comprising:
   a user operable input device; and wherein the editing processor is connected to the frame-random access store and for processing data representing one or more image frames of one or more initial sequences in response to the user operable input device to produce processed data representing an processed, edited sequence, which processed data is stored in the frame-random access store.

34. An editing system as claimed in claim 33, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

35. An editing system as claimed in claim 1, wherein said one or more initial sequences are captured at a frame rate of 24 per second and each frame comprises 625 image lines, and the input circuit is arranged to receive the data and transfer the same to the store at an input rate substantially corresponding to 25 frames per second and 625 lines.

36. An editing system as claimed in claim 35, wherein said processor is arranged to edit data at a processed data rate substantially corresponding to 24 frames per second and 625 lines, and the output circuit is arranged to output data at an output data rate substantially corresponding to the processed data rate.

37. An editing system as claimed in claim 35, wherein said processor is arranged to edit data at a processed data rate substantially corresponding to 24 frames per second and 625 lines, and the output circuit is arranged to output data at an output data rate substantially corresponding to 30 frames per second and 525 line.

38. An editing system as claimed in claim 37, wherein said processor is arranged to extract frame data from the frame-random access store as pairs of interleaved fields and to repeat the transfer of one field of each pair to the output circuit thereby causing the output circuit to output the edited sequence at said frame rate of 30 per second.

* * * * *